(12) United States Patent
Martin et al.

(10) Patent No.: US 11,624,215 B2
(45) Date of Patent: Apr. 11, 2023

(54) LIFTING HANDLE CONSTRUCTION FOR VEHICLE TILT BED

(71) Applicant: Honda Motor Co., Ltd., Tokyo (JP)

(72) Inventors: Jason L. Martin, Dublin, OH (US); Kyle J. Streetz, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 554 days.

(21) Appl. No.: 16/671,083

(22) Filed: Oct. 31, 2019

(65) Prior Publication Data

US 2021/0131150 A1  May 6, 2021

(51) Int. Cl.
  *B60P 1/28* (2006.01)
  *E05B 79/06* (2014.01)

(52) U.S. Cl.
  CPC .............. *E05B 79/06* (2013.01); *B60P 1/283* (2013.01)

(58) Field of Classification Search
  CPC .......... E05B 79/06; B60P 1/283; B60P 1/286; B60P 1/28; Y10T 16/509
  USPC ................... 298/17 R, 22 R; 296/1.02, 183.2
  See application file for complete search history.

(56) References Cited

U.S. PATENT DOCUMENTS

| | | | |
|---|---|---|---|
| 6,394,555 B2 | 5/2002 | Kawasaki | |
| 7,578,544 B1* | 8/2009 | Shimamura | B60N 2/305 296/183.2 |
| 9,108,559 B1 | 8/2015 | Kawasaki | |
| 9,187,023 B2 | 11/2015 | Kawasaki | |
| 9,352,496 B2* | 5/2016 | Takahashi | B60R 21/13 |
| 10,112,659 B2* | 10/2018 | Tsumiyama | B60K 8/00 |
| 10,493,892 B2* | 12/2019 | Tsumiyama | B62D 33/02 |

* cited by examiner

*Primary Examiner* — Christine M Mills
*Assistant Examiner* — Thomas L Neubauer
(74) *Attorney, Agent, or Firm* — Plumsea Law Group, LLC (57) ABSTRACT

A tilt bed for a multi-utility vehicle that is movable from a flat conveying positon to a tilted dump position. The tilt bed has a lift handle construction that combines a molded thermoplastic portion integral with the tilt bed body and a handle bracket that provides reinforcement in the appropriate location to provide a sturdy handle for ease of lifting. The bracket has at least a yoke shape underlying the bed body and is co-extensive with a neighboring edge of the bed body to provide a comfortable lift area. The bracket is rigidly attached to the bed body, and may also have a more robust shape such as a closed loop. For added stiffness and strength, the bracket may also be rigidly connected to the bed frame.

17 Claims, 8 Drawing Sheets

LIFTING HANDLE CONSTRUCTION FOR VEHICLE TILT BED

BACKGROUND OF THE INVENTION

1. Field of the Invention

The present invention relates to a lifting handle construction for a vehicle tilt bed having a thermoplastic body.

2. Description of Related Art

A multi-utility vehicle may be equipped with an open cargo bed that is often a tilt bed meaning that the cargo bed may be rotated or tilted in order to dump or empty the contents of the bed. A conventional configuration is to have the tilt bed mounted on a vehicle frame with a rear portion rotatably mounted to the frame, and a front portion of the tilt bed resting on the frame in a conveying position, and being movable or tiltable in an upward direction into a dumping position. When the front portion of the bed is moved upward, the bed tilts by rotating about the rear attachment to hereby dump the contents of the bed rearward of the vehicle bed. If the cargo bed has an open top, box-like shape, the rear-most wall may be a tail gate which may be opened to facilitate dumping.

Certain multi-utility vehicles are designed for off-road tasks or recreational use with an emphasis on lightweight mobility. Conventional multi-utility vehicles of this type may be provided with a cargo bed formed of heavy duty rigid thermoplastic.

Reducing the weight of typical thermoplastic tilt beds for off-road vehicles while maintaining structural integrity is an ongoing pursuit in vehicle design.

SUMMARY OF THE INVENTION

A multi-utility vehicle with a tilt bed rotatably or tiltably mounted on the rear end of the vehicle movable from a flat conveying positon to a tilted dump position is provided with a handle construction for the tilt bed that provides a sturdy, comfortable rest portion for a user's hand to lift the bed into the dump position. The lift handle construction is a combination of a thermoplastic molded portion integral with the tilt bed body and a handle bracket that provides reinforcement in the appropriate location to provide a sturdy handle for ease of lifting, but is also lighter weight than typical beds. The bracket has at least a yoke shape underlying the bed body and is co-extensive with a neighboring edge of the bed body to provide a comfortable lift area. The bracket is rigidly attached to the bed body by a fastener provided through the bed body. The bracket may also have a more robust shape such as a closed loop and may also be rigidly connected to a counterpart bracket on the opposite side of the tilt bed body thus providing a sturdy reinforcement that spans across the bed body from handle bracket to handle bracket to provide sufficient strength of bearing the weight of a loaded tilt bed.

In one embodiment, a tilt bed for a utility vehicle having a body frame defining a front end of the vehicle on which an occupant portion is disposed and a rear end of the vehicle, the tilt bed is movable between a substantially flat conveying position and a tilted dumping position. The tilt bed comprises an injection molded thermoplastic cargo bed body defining a front end, a tail end and parallel sides. The bed body is tiltably mounted to the body frame at the rear end of the vehicle. The tilt bed includes a lifting handle comprising an integrally molded handle area of the bed body at the front end and along a side of the bed body, and a lift handle bracket closely underlying and attached within the molded handle area of the bed body to provide a reinforced lifting construction.

The molded handle area includes an L-shaped hollow including a horizontal leg portion extending inwardly from the side of the bed body to receive the lift handle bracket positioned to be at last partially coextensive with the horizontal leg portion to provide a comfortable reinforced lifting construction.

In another aspect, the handle bracket is yoke shaped and has a contour similar to the edge of the bed body.

In another aspect, the handle bracket has additional support member so as to be a closed loop shaped reinforcement member.

In yet another aspect, a mirror image handle construction is provided on the opposite side of the tilt bed so that it can be tiled by lifting on either side.

In another aspect, the handle bracket is rigidly attached to a portion of the bed frame for enhanced stiffness and strength.

In yet another aspect, the handle bracket is positioned in the molded handle area such that a portion of the bracket is co-extensive with the lower horizontal edge of the handle area to provide a comfortable handle area.

Other systems, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
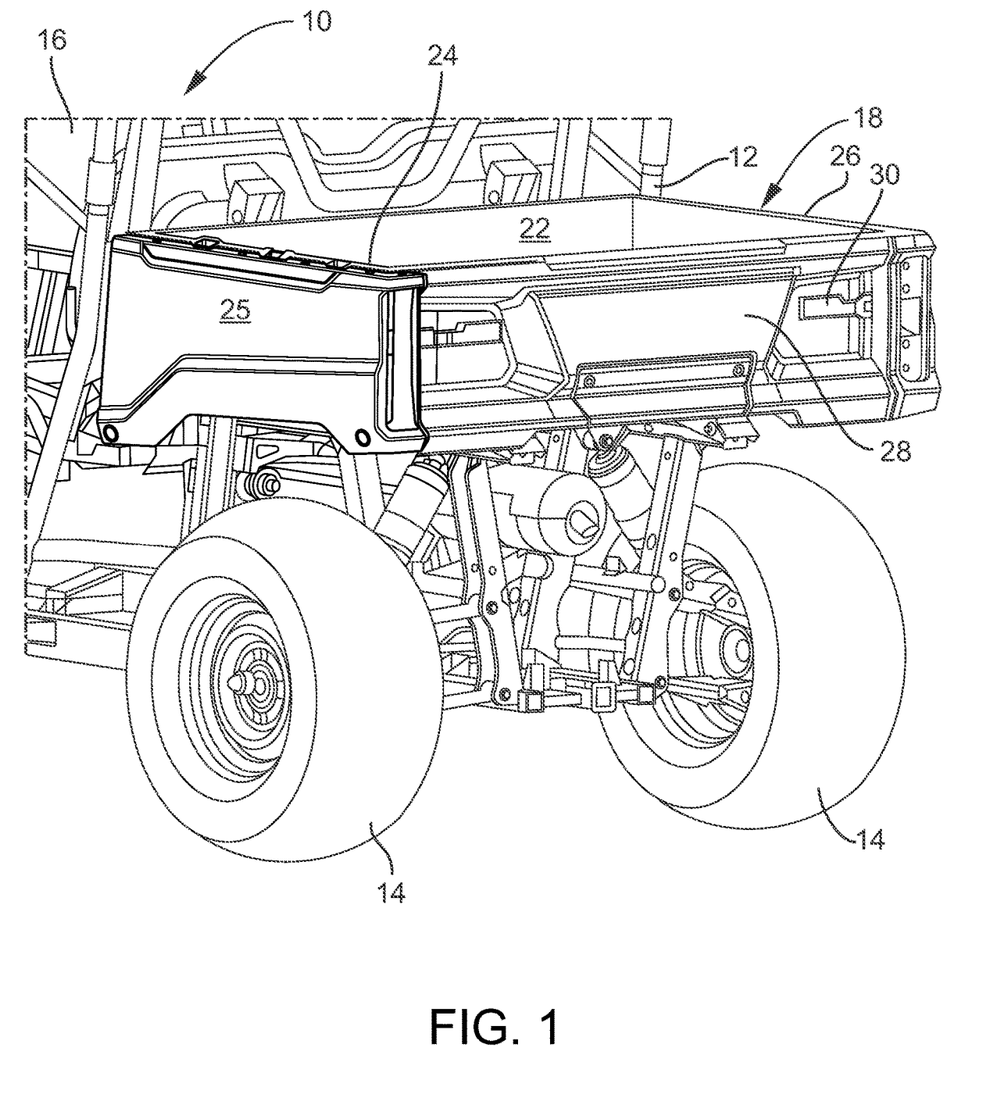
FIG. 1 is a rear perspective view of a utility vehicle with an exemplary embodiment of a tilt bed according to the disclosure herein.
Figure 2:
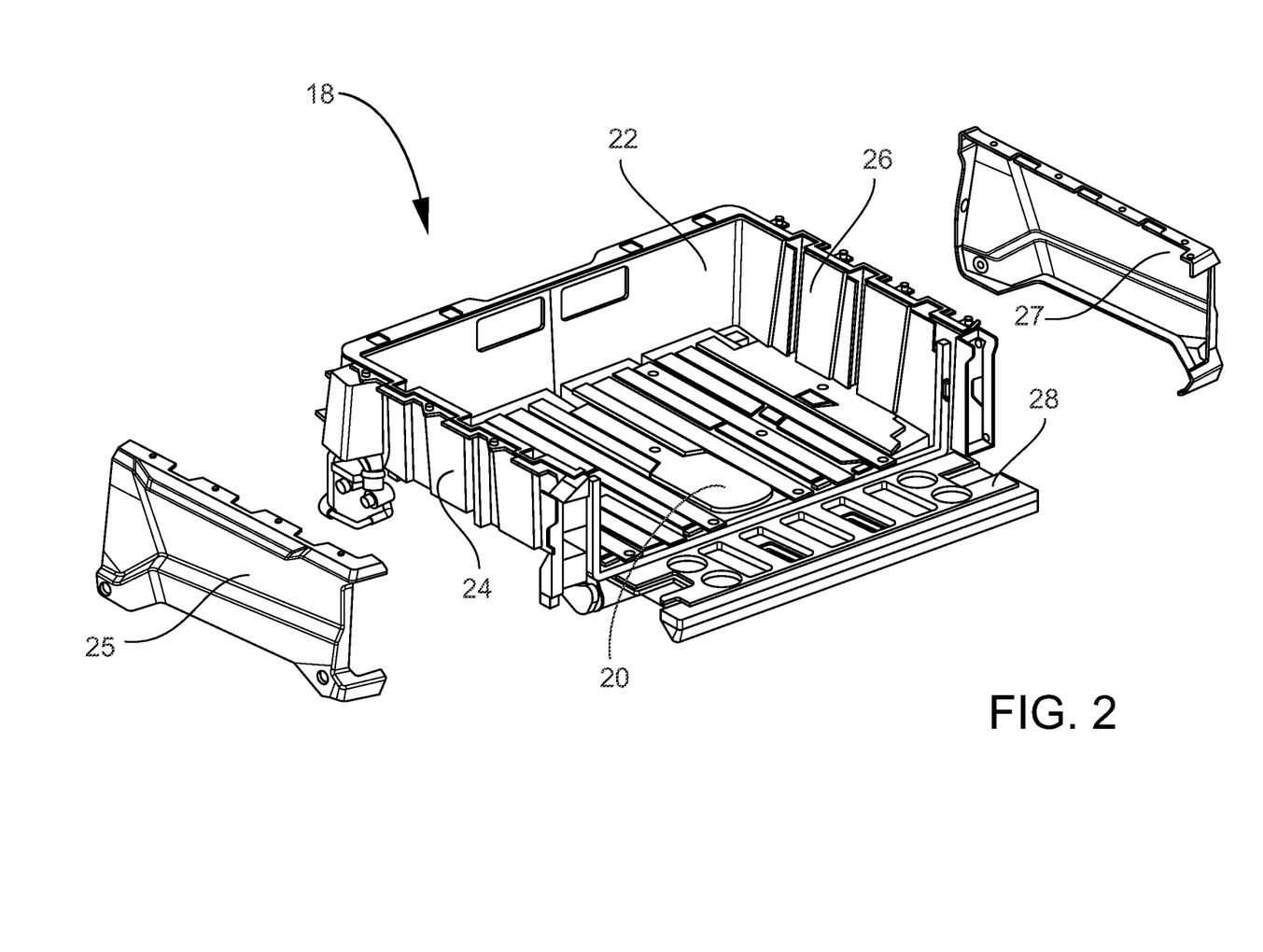
FIG. 2 is a rear perspective view of the tilt bed in isolation and shown in partial exploded view with the tail gate in an open position and the tilt bed in a flat position.
Figure 3:
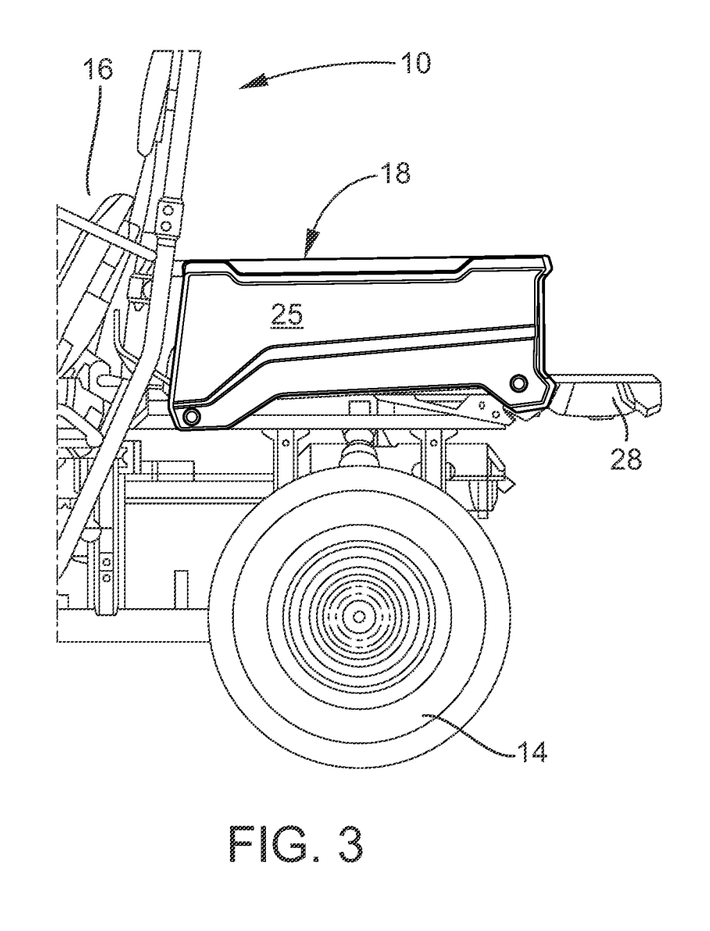
FIG. 3 is a side elevational view of the utility vehicle shown in FIG. 1 with the tail gate in an open position and the tilt bed in a flat, conveying position.

Multi-utility vehicles designed for off-road tasks or recreational use have in their design and configuration an emphasis on lightweight mobility. Conventional multi-utility vehicles of this type may be provided with a cargo bed that is often a tilt bed that rotates from a flat conveying position to a tilted dump position. With reference to FIGS. 1-3, a utility vehicle according to an exemplary embodiment of the disclosure is shown generally by reference numeral 10. Utility vehicle 10 includes a body frame 12, a plurality of tires 14, an occupant area 16 on the front end of the vehicle having one or more seats, and a tilt bed 18 mounted on the rear end of the vehicle. The utility vehicle 10 is powered by an engine provided and vehicles of this general nature are known in the art and a further description of the typical details thereof are therefore omitted. The figures illustrate the rear end of a multi-utility vehicle 10 and omits details of the front end and the occupant area.

Tilt bed 18 includes a cargo bed body or bottom surface 20 on which cargo can be carried. Tilt bed 18 may also be equipped with a cargo box comprising a front wall 22, left side wall 24, right side wall 26 and a rear wall which is illustrated as a tail gate 28 attached to the cargo bed to provide an open box-like configuration. The cargo box defined by front wall 22, left wall 24, right wall 26 and tail gate 28 comprise a bed body, and is illustrated as an open-top box in FIGS. 1-2, in FIG. 2 with tail gate 28 down or open. The directional adjectives employ the perspective of a driver on the left front portion of the occupant compartment facing forward, and are for convenient reference and do not affect the scope of the claims.

Figure 4:
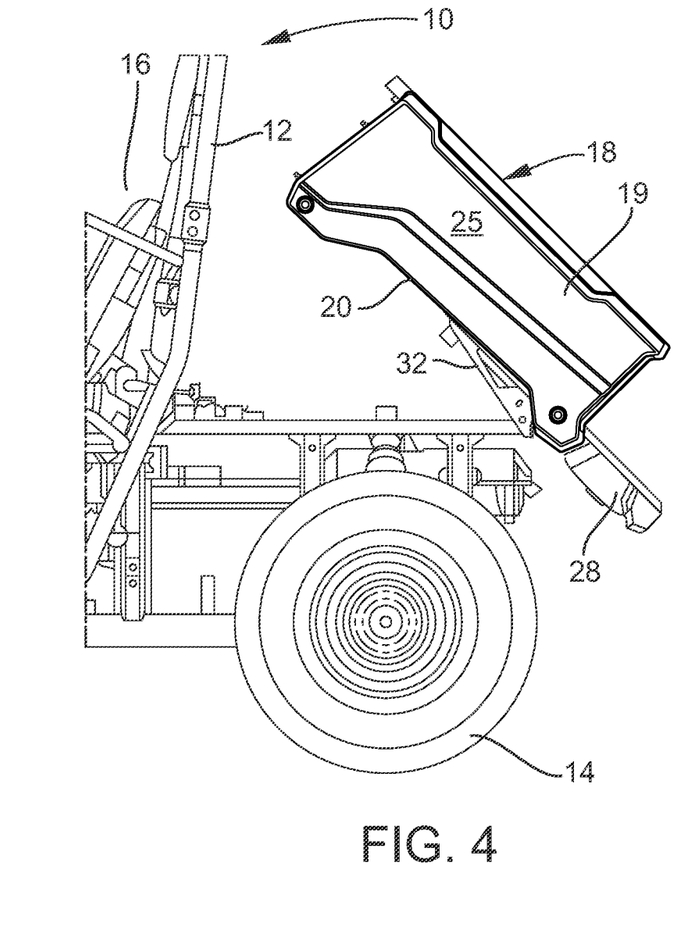
FIG. 4 is a side elevation view of the utility vehicle shown in FIG. 1 with the tail gate in an open position and the tile bed in a tilted, dump position.

Side walls 24 and 26 are disposed substantially perpendicular and upward from the peripheral sides of the bottom surface 20. The rear wall is substantially defined by the rear tail gate 28. Tail gate 28 is configured to be pivotally mounted on cargo bed body to thereby have a closed or up position as shown in FIG. 1, and an open or down position as shown in FIGS. 2-4. In the closed or up position, the tail gate 28 is substantially perpendicular to the bottom surface 20. In the open or down position, the tail gate 28 is positioned substantially aligned with a plane of the bottom surface 20 so as to facilitate easy loading and unloading onto or off of the cargo bed 18. The tail gate 28 may include manually releasable latches 30 that allow it to be opened or closed. Other types of securing mechanisms known in the art, such as, for example, catch pins, cinch latch structures, and the like, can of course also be used to secure the tail gate in the closed position and release it to obtain the open position.

The construction of tilt bed 18 can be seen in more detail in FIG. 2 which shows a left side cover panel 25 and a right side cover panel 27 illustrated in partial exploded view. It can be seen that left cover panel 25 covers the exterior of left side wall 24, and right cover panel 27 covers the exterior of right side wall 26. These cover panels 25 and 27 may not necessarily be structural and may therefore be thinner and lighter weight than the side walls of the tilt bed cargo box. Cover panels 25 and 27 provide protection for the cargo box, and the possibility of design freedom regarding their form and appearance. Cover panels 25 and 27 may also be formed by injection molded thermoplastic as well. When cover panels 25 and 27 are assembled to their respective side walls 24 and 26, it can be seen that a top ledge is formed at the intersection. This provides a sturdy and robust construction for the top ledge of the cargo box. The resulting thickness of entire side wall is the combination of the either side wall 24 with cover panel 25 or side wall 26 with cover panel 27. The dual thermoplastic layer construction of each side wall also provides a sturdier shape and appearance.

Tilt bed 18 is configured to be movable about a rotation fulcrum located near the rear end of the vehicle between a normal conveying position, FIGS. 1-3, in which cargo bed is substantially flat and a tilted or dump position, FIG. 4, in which the front portion is in a raised state relative to the support base of the cargo bed. When in the dump position, the tail gate 28 is also usually in the lowered or open position as shown in FIG. 3 in order to allow contents of the cargo bed to be emptied or dumped.

Figure 5:
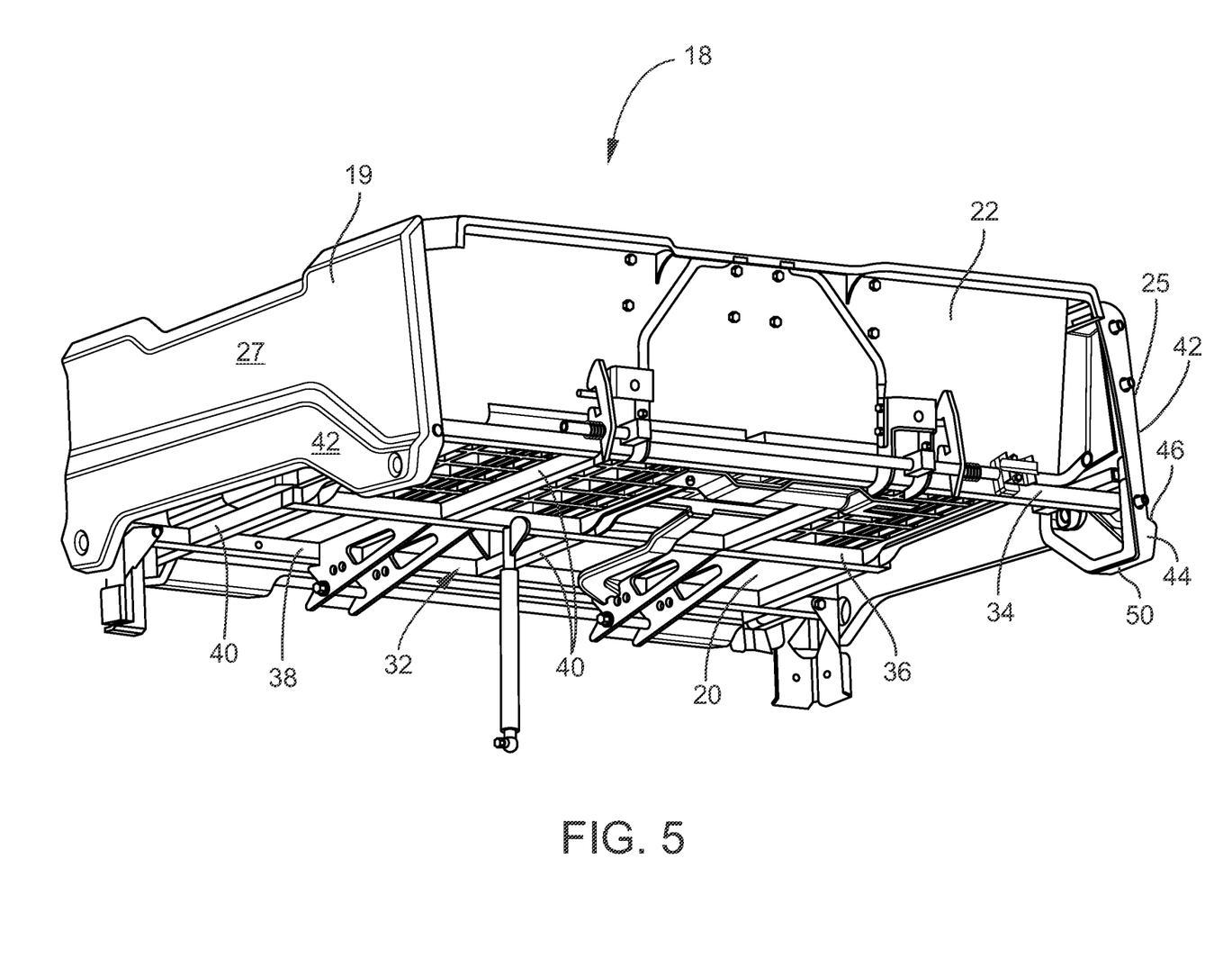
FIG. 5 is a perspective view of the tilt bed viewed from underneath the bed.

Referring to FIG. 5, a possible construction of tilt bed 18 is illustrated in isolation. FIG. 5 shows tilt bed 18 from the perspective of a viewer observing the front wall 22 and looking rearward. Tilt bed 18 comprises a bed frame 32 providing a supporting base structure, and a light weight cargo bed body 19. Cargo bed body 19 includes a bed bottom surface 20, and may also include the vertical surfaces such as front wall 22, side wall 24 and its cover panel 25, side wall 26, and its cover panel 27, and tail gate 28 to provide an open box-like shape. As used within this disclosure, the term cargo bed body 19 refers to at least the cargo bed 20 and may also refer to the integral box-like structure that includes these walls. Cargo bed body 19 is attached to bed frame 32 and this assembly is mounted on the vehicle. The cargo bed body 19 of the present disclosure may be an injection molded thermoplastic, such as polypropylene, which reduces the overall weight of the component. This is in contrast to typical cargo beds formed of a heavier weight rigid thermoplastic. In FIG. 5, bed frame 32 is illustrated as including a front transverse beam 34 extending transversely across the bed from the right to left side and located near the front portion of the bed, a mid beam 36 substantially parallel to the front beam and located centrally between the front and rear portions of the bed, and a rear beam 38 substantially parallel to beams 34 and 36, and located at the rear portion of the bed. These transverse beams are connected by longitudinal struts 40 that extend substantially front to back. As seen in FIG. 5, bed frame 32 provides structural integrity to tilt bed 18, and provides a framework or skeleton onto which cargo bed body 19 is attached.

Bed frame 32 provides sufficient strength and structural integrity to tilt bed 18, and cargo bed body 19 provides a sturdy and light weight option for the tilt bed. When loaded, the tilt bed will be heavier due to the weight of the load, and reinforcement of the handle construction is provided to provide sufficient strength and a sturdy feel when lifting to the tilted dump position. The present disclosure addresses this possibility by providing a handle bracket as reinforcement underneath the cover panels.

Figure 6:
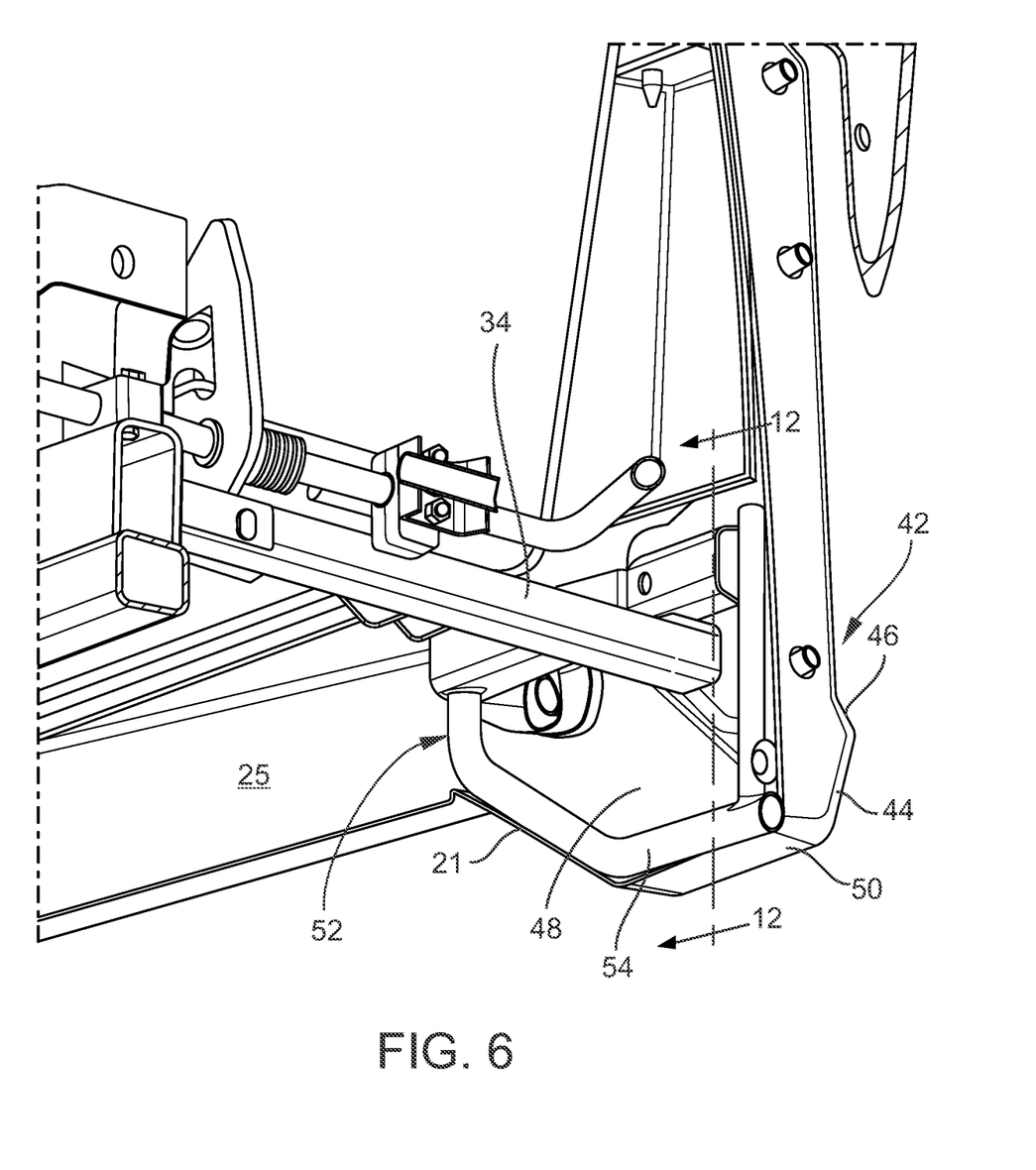
FIG. 6 is a schematic close-up perspective view of an interior front area of the tilt bed.
Figure 7:
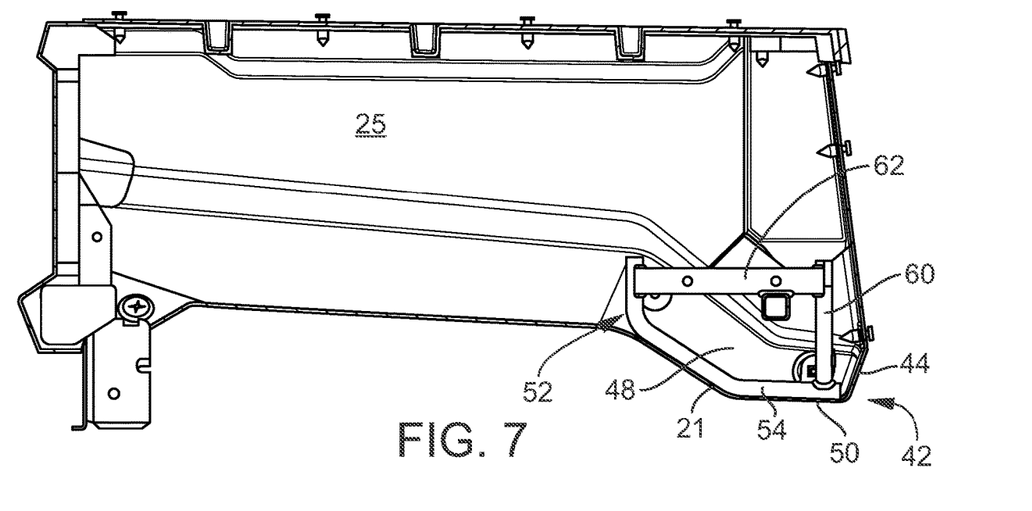
FIG. 7 is an interior elevation view of a side wall of the tilt bed.

FIGS. 6-12 illustrate the details of the handle construction for the tilt bed. FIG. 6 is a close-up perspective view of the handle area and some details of the bed and frame not pertinent to the handle construction have been omitted for clarity. Also, FIG. 7 is a schematic elevation view of the interior of cover panel 25 viewed from the left side wall. A handle structure 42 is integrally formed with cover panel 25. In the illustrated embodiment, a widened handle ledge 44 is integrally formed with cover panel 25 or 27. Handle ledge 44 is an enlarged area compared to the upper portion of cover panel 25 or 27, and includes a sloped surface 46 that transitions from the side wall to ledge 44. Sloped surface 46 flares outward relative to cover panel 25 or 27 to provide the enlarged area. Handle ledge 44 has a mostly vertical portion that extends downward toward the bottom edge of the ledge. At the bottom edge of the ledge, handle ledge 44 includes an L-shaped hollow 48 formed by a horizontal leg portion 50 extending inwardly from ledge 44 to present a comfortable resting area for a user's hand.

Positioned inside hollow 48 is a handle bracket 52 formed of a sturdy material such as metal. Handle bracket 52 is underlying the thermoplastic bed body, and handle bracket 52 may have various configurations to serve its function of reinforcing the handle construction. In the figures, handle bracket 52 is shown to include a yoke shaped portion 54 having a shape and contour that follows the bottom edge of cover panel 25, marked in the figures as bottom edge 21 to provide a co-extensive relationship between the bracket and horizontal leg portion 50 of handle ledge 44. This relationship is best seen in FIGS. 9-12, and is formed by a round cross section yoke shaped portion 54 positioned such that its center line C, in cross section, is substantially co-extensive with the edge of horizontal leg portion 50 to present a comfortable resting area for a user's hand. The proportions of this co-extensive area may be configured to enable the fingers of a user's hand to naturally curl around the curvature of yoke shaped portion 54.

Figure 8:
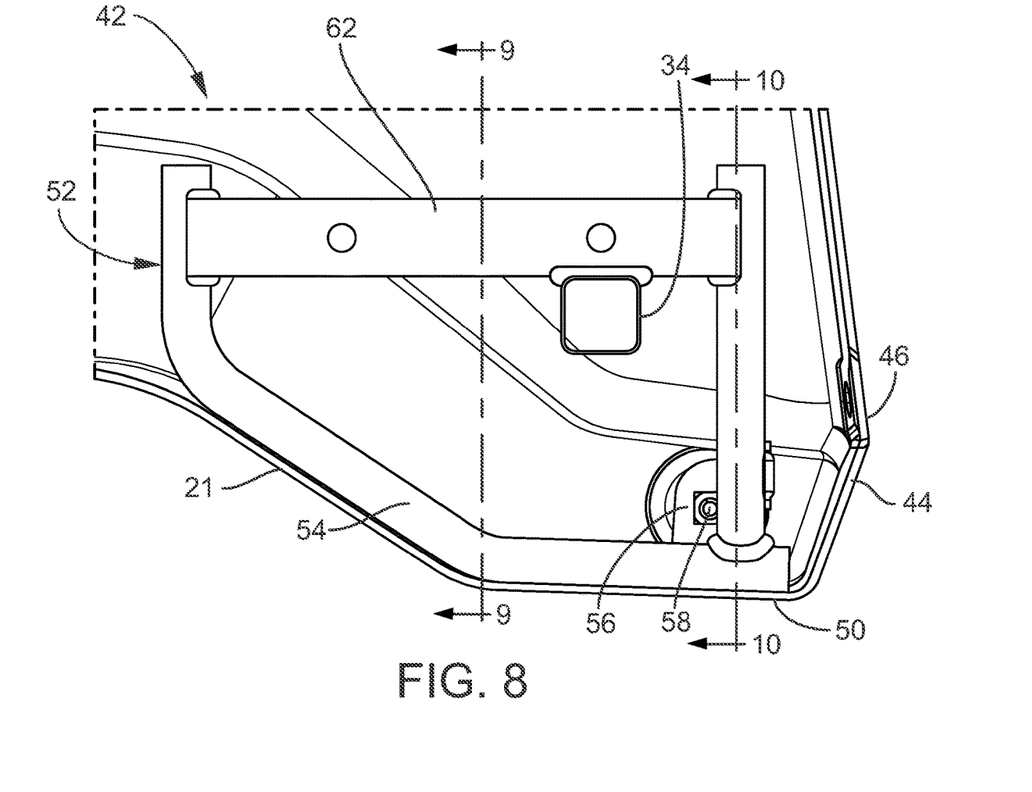
FIG. 8 is a close-up elevation view of a handle bracket.
Figure 9:
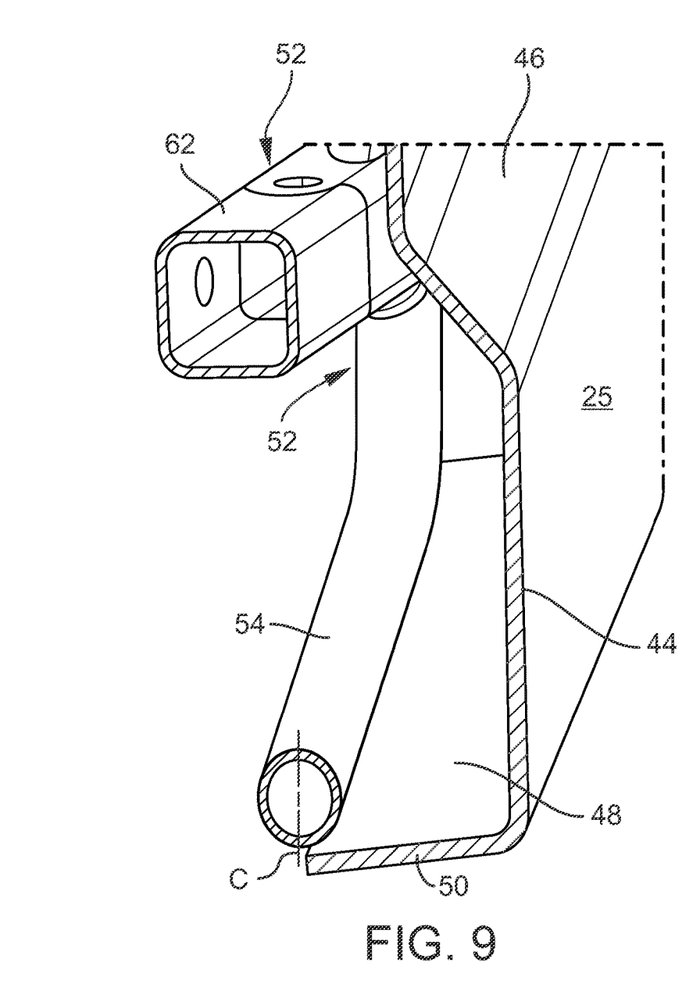
FIG. 9 is a schematic cross section of the handle bracket and cargo bed body taken long line 9-9 of FIG. 8.
Figure 10:
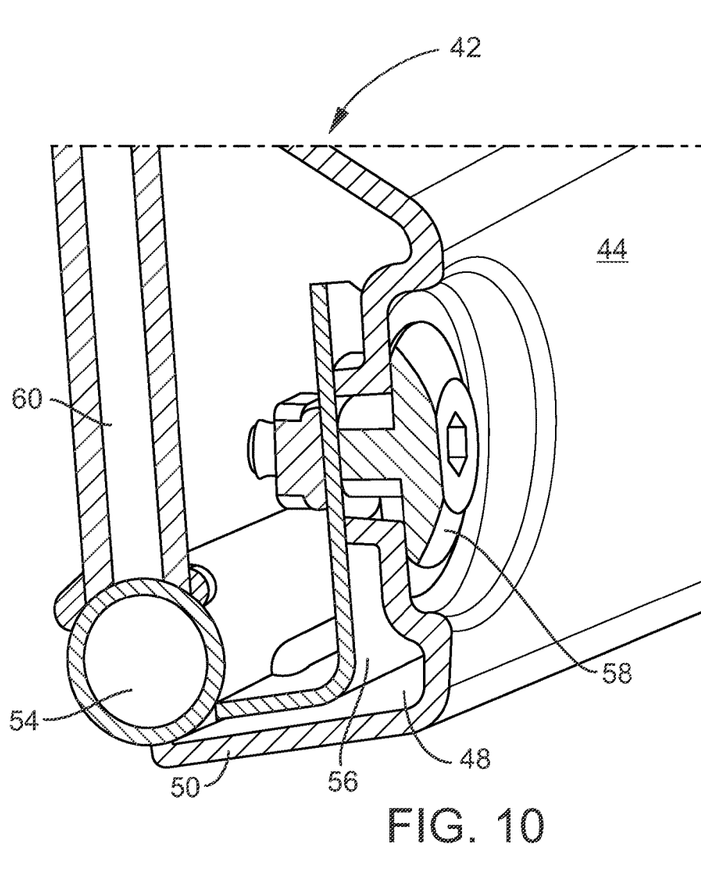
FIG. 10 is a schematic cross section of the handle bracket and cargo bed body taken along line 10-10 of FIG. 8.
Figure 11:
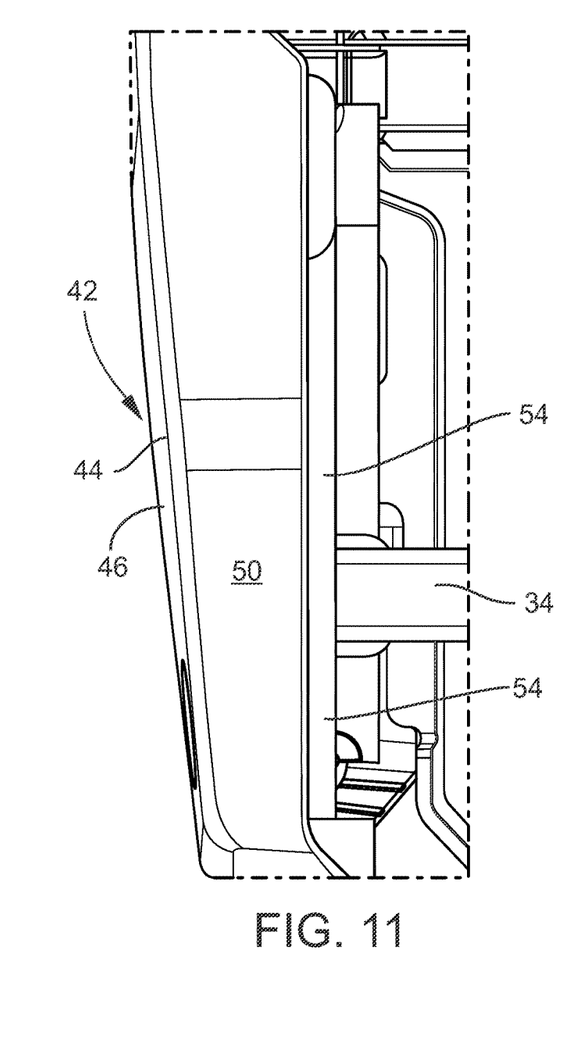
FIG. 11 is a detailed bottom plan view of the handle area of the tilt bed similar to the illustrated portion shown in FIG. 8.
Figure 12:
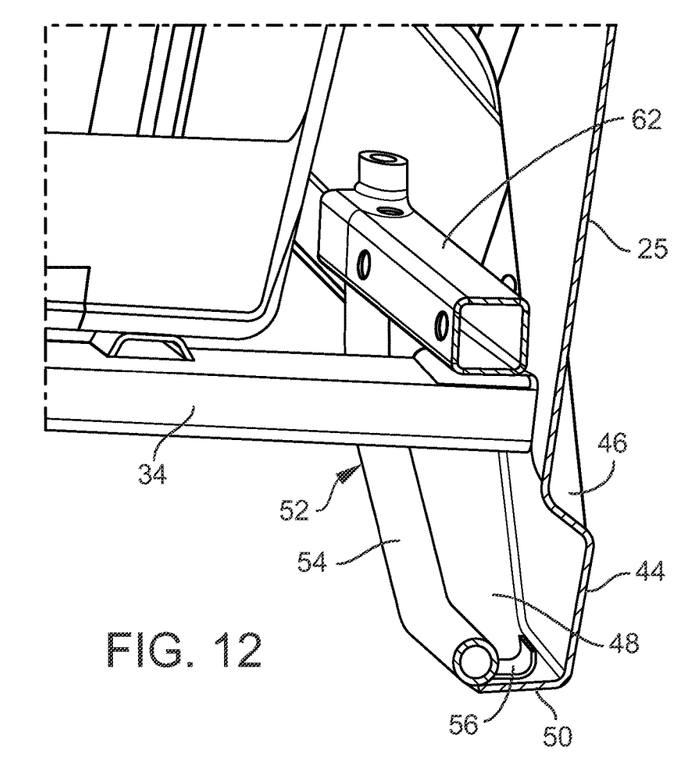
FIG. 12 is a schematic cross section of the handle bracket and cargo bed body viewed along line 12-12 of FIG. 6.

Yoke shaped portion 54 of handle bracket 52 is shaped to follow the contour of bed edge 21 as best seen in FIGS. 6-12. Handle bracket 52 is rigidly attached to cover panel 25 via an attachment flange 56 integral with yoke shaped portion 54 having an aperture aligned with a counterpart aperture to receive a fastener 58. This is best seen in FIGS. 8, 10 and 12.

Handle bracket 52 may also include a vertical member 60 extending upward from the yoke shaped portion 54 near the front edge of cover panel 25, and an upper horizontal member 62 that connects vertical member 60 to the opposite end of yoke shaped portion 54 to thereby form a closed loop shaped bracket. Closed loop shaped bracket encompasses yoke shaped portion 54, vertical member 60 and horizontal member 62, and provides an even more robust and sturdy lift handle construction. Handle bracket 52 may also be rigidly attached to transverse beam member 34 or another portion of bed frame 32 in order to provide enhanced stiffness and strength. This is particularly true when the bed is loaded for dumping as a stiffer and stronger lift construction will be advantageous over flimsy or bendable tilt bed bodies.

FIG. 11 illustrates a bottom view of the handle area viewed from underneath the bed. Horizontal leg 50 of handle 52 is shown to be co-extensive with yoke shaped member 54. This combination of structures provides the comfortable lift handle area for a user's hand.

While the figures detail the handle construction on one side of the tilt bed, the mirror image handle construction may be provided on the opposite side such that a user may lift the tilt bed from either the left or right side of the vehicle. For a tilt bed with this handle construction on both sides of the bed body, both handle brackets may be rigidly attached to a transverse beam 34 or another portion of the bed frame to provide stiffness and strength across the entire width of the bed when lifted. While the handle brackets are illustrated as being attached to beam 34 through horizontal member 62, it is contemplated that the yoke shaped portion may be attached to transverse beam or other portion of the bed frame directly.

Construction is described mainly for a manual tilt bed, but the handle construction rigidly attached to the frame could be employed in an electric or hydraulic tilt system as well. While the bed body has been described as being molded of thermoplastic by injection molding or the like, any suitable process is contemplated for constructing the thermoplastic bed body. The bed body may also be constructed from other materials such as fiberglass or other types of composites that provide the necessary design freedom regarding the contours and shapes.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A tilt bed for a utility vehicle having a body frame defining a front end of the vehicle on which an occupant portion is disposed and a rear end of the vehicle, the tilt bed being movable between a substantially flat conveying position and a tilted dumping position, said tilt bed comprising:
    a cargo bed body defining a front end, a tail end and parallel side walls, each said side wall comprising an inner side wall and an outer cover panel, said bed body adapted to be tiltably mounted to the body frame at the rear end of the vehicle; and
    a lifting handle provided on said bed body, said lifting handle comprising an integrally molded handle area in said outer cover panel at the front end thereof, and a lift handle bracket closely underlying and attached within the molded handle area of said outer cover panel to provide a reinforced lifting construction;
    wherein said lift handle, including the molded handle area in said outer cover panel and the lift handle bracket attached thereto, is configured to be movable with the cargo bed body; and
    wherein said handle area includes an L-shaped hollow including a horizontal leg portion extending inwardly from the side of said cover panel, said lift handle bracket positioned to be at last partially coextensive with said horizontal leg portion to provide a comfortable reinforced lifting construction.

2. The tilt bed recited in claim 1, wherein said lift handle bracket is a closed loop reinforcement member.

3. The tilt bed recited in claim 2, wherein said lifting handle is provided on each side of said cargo bed body on each said outer cover panel.

4. The tilt bed recited in claim 3, wherein said lifting handles on each side of said bed body are connected to one another via a transverse beam.

5. The tilt bed recited in claim 1, wherein said lift handle bracket is a reinforcement member comprising a base and opposing side members disposed at an obtuse angle relative to the base.

6. The tile bed recited in claim 5, wherein said lifting handle is provided on each side of said bed body.

7. The tilt bed recited in claim 6, wherein said lifting handles on each side of said bed body are connected to one another via a transverse beam.

8. A tilt bed assembly for a utility vehicle having a body frame defining a front end of the vehicle on which an occupant portion is disposed and a rear end of the vehicle, the tilt bed being movable between a substantially flat conveying position and a tilted dumping position, said tilt bed comprising:

a cargo bed body defining a front end, a tail end and parallel sides, each said side comprising an outer cover panel;

a bed frame attached to said bed body and providing structural support thereto, said bed frame to be mounted to the vehicle body frame at the rear end of the vehicle and comprising a transverse beam spanning a width of said bed frame at a front end of said bed body; and a lifting handle comprising an integrally molded handle area of said cover panel at the front end thereof and along a side of said bed body, and a lift handle bracket attached to said bed frame and closely underlying and attached within the molded handle area of said cover panel to provide a reinforced lifting construction;

wherein said handle area includes an L-shaped hollow including a horizontal leg portion extending inwardly from the side of said bed body, said lift handle bracket positioned to be at last partially coextensive with said horizontal leg portion to provide a comfortable reinforced lifting construction; and wherein said lifting handle, including the molded handle area and the lift handle bracket, is configured to be movable with the cargo bed body.

9. The tilt bed recited in claim 8, wherein said handle bracket is a closed loop reinforcement member.

10. The tilt bed recited in claim 8, wherein said bed body comprises a front wall on the front end, a tail gate along the tail end and inner side walls on each of the parallel sides to provide an open box cargo bed body.

11. The tilt bed recited in claim 8, wherein said lifting handle is provided on each side of said bed body and said respective handle frames are rigidly connected to one another via said transverse beam.

12. The tilt bed recited in claim 11, wherein each said handle area includes an L-shaped hollow including a horizontal leg portion extending inwardly from the side of said cover panel, said lift handle bracket positioned to be at last partially coextensive with said horizontal leg portion to provide a comfortable reinforced lifting construction.

13. A lift handle construction for a tilt bed of a utility vehicle defining a front end of the vehicle for an occupant portion and a rear end of the vehicle, the tilt bed having a cargo bed with a front end, a tail gate and substantially parallel side walls each including an inner side wall and a cover panel, said side walls connecting the front end to the tail gate and defining a front portion and a tail portion and adapted to be tiltably mounted to the vehicle, the tilt bed being movable between a substantially flat conveying position and a tilted dumping position, said handle construction comprising:

an outwardly flared handle area proximate the front end of the tilt bed and integrally molded with said cover panel; and a reinforcing handle bracket attached to the handle area inward of the cover panel and configured to follow a contour of the handle area so as to provide a reinforced lift handle;

wherein said handle area includes an L-shaped hollow including a horizontal leg portion extending inwardly from an exterior surface of the tilt bed, and wherein said handle bracket is positioned to be at least partially coextensive with said horizontal leg portion and configured to provide a comfortable reinforced handle for a user to grasp both the handle bracket and the horizontal leg portion of the handle area.

14. The lift handle construction of claim 13, wherein said lift handle construction is provided on each side of the tilt bed.

15. The lift handle construction of claim 14, further comprising a transverse support member connected to each of said lift handle constructions.

16. The lift handle construction of claim 13, wherein said handle bracket is a closed loop reinforcement member.

17. The lift handle construction of claim 13, wherein said handle area and said handle bracket attached thereto are configured to be movable with the tilt bed.

\* \* \* \* \*